United States Patent
Inoue et al.

(10) Patent No.: US 6,772,041 B2
(45) Date of Patent: Aug. 3, 2004

(54) HARDENING EQUIPMENT AND HARDENING METHOD

(75) Inventors: Toshihiko Inoue, Komaki (JP); Masaki Itoh, Aichi-ken (JP); Toshihiko Asari, Komaki (JP); Naoomi Miyagawa, Gifu (JP)

(73) Assignee: Yamazaki Mazak Kabushiki Kaisha, Aichi-ken (JP)

( * ) Notice: Subject to any disclaimer, the term of this patent is extended or adjusted under 35 U.S.C. 154(b) by 192 days.

(21) Appl. No.: 10/154,991

(22) Filed: May 24, 2002

(65) Prior Publication Data

US 2002/0179581 A1 Dec. 5, 2002

(30) Foreign Application Priority Data

May 31, 2001 (JP) .......................................... 2001-165237

(51) Int. Cl.[7] .......................... B23K 26/00; G06F 19/00
(52) U.S. Cl. ........................ 700/166; 700/159; 700/160; 219/121.6
(58) Field of Search ........................... 700/95, 117, 159, 700/160, 166; 219/121.6, 121.78

(56) References Cited

U.S. PATENT DOCUMENTS

| | | | | |
|---|---|---|---|---|
| 4,304,978 A | * | 12/1981 | Saunders | ................. 219/121.6 |
| 4,459,458 A | * | 7/1984 | Vetsch et al. | ............ 219/121.6 |
| 4,659,902 A | * | 4/1987 | Swensrud et al. | ..... 219/121.78 |
| 6,218,642 B1 | * | 4/2001 | Christmas et al. | ..... 219/121.66 |

FOREIGN PATENT DOCUMENTS

JP 2002-129239 * 9/2002

* cited by examiner

*Primary Examiner*—Jayprakash N. Gandhi
(74) *Attorney, Agent, or Firm*—Wolf, Block, Schorr and Solis-Cohen LLP; Richard P. Gilly

(57) ABSTRACT

A nozzle holding means (13) having a nozzle (19) being free to eject laser beam from its top end is provided being free to move along a guide means among a plurality of machine tools. Nozzle holding means operation control means (6, 33) for controlling hardening operation on a workpiece by the nozzle are provided, and communication control means (6, 33) are provided for exchanging information necessary for hardening operation on a workpiece to be machined with each machine tool between the control means and a control means of each machine tool. The nozzle moves among the machine tools and hardening operation is performed on workpieces (29, 30) in the respective machine tools, thereby it is not necessary to provide a hardening unit for exclusive use every each machine tool, and it is possible to provide a hardening equipment having high working ratio.

12 Claims, 2 Drawing Sheets

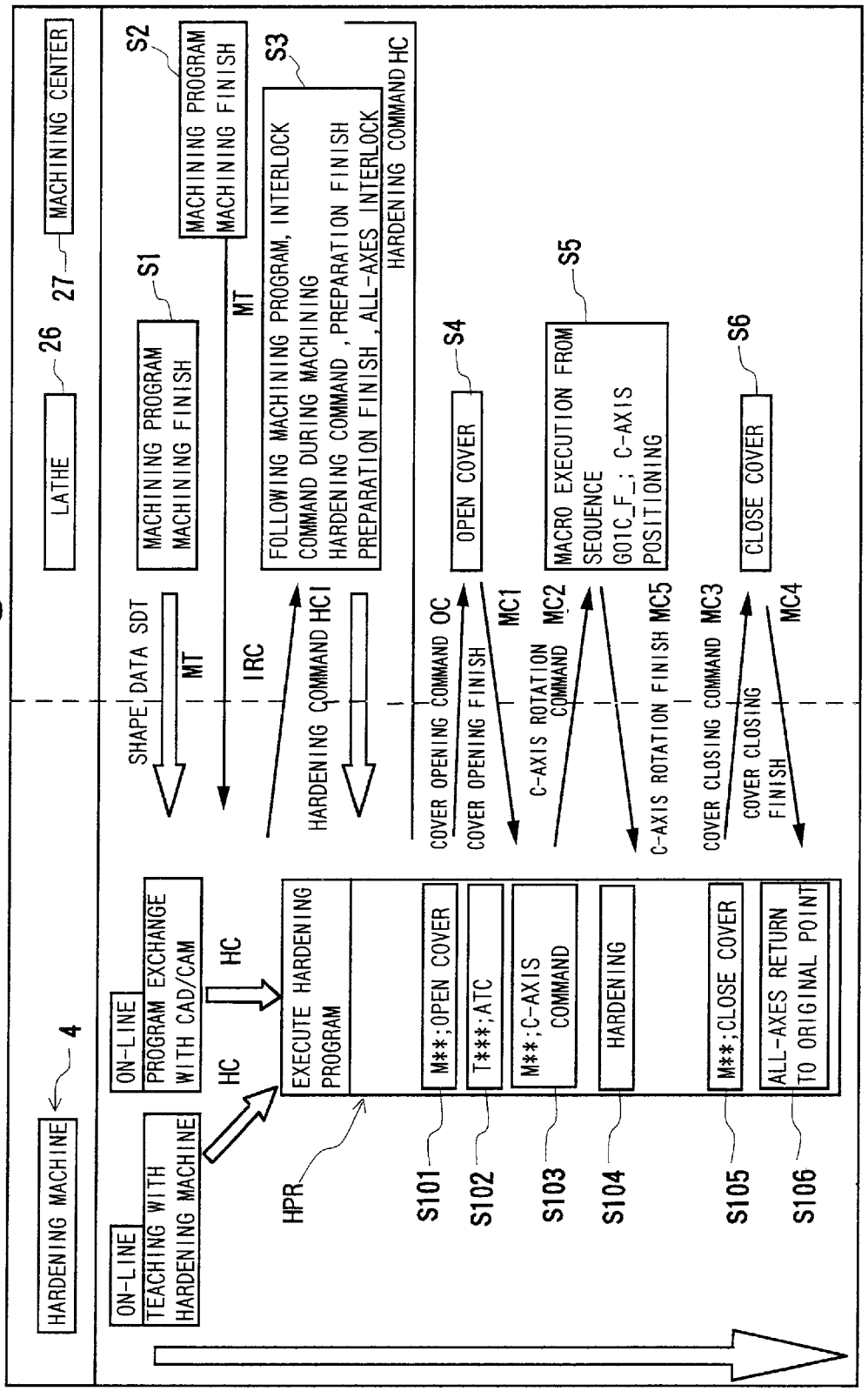

HARDENING EQUIPMENT AND HARDENING METHOD

BACKGROUND OF THE INVENTION

This invention relates to a hardening equipment capable of hardening on a workpiece machined with a machine tool, such as a lathe and a machining center, in said machine tool, and relates to a hardening control method to be applied in the hardening.

A conventional measure in hardening on a workpiece machined in a machine tool is to provide a hardening unit in a machine tool.

But, it is necessary to provide a hardening unit for each machine tool in such a method, and the scale of the whole equipment inconveniently becomes large. And, the hardening unit is out of operation during machining on a workpiece with each machine tool. Then, a problem in low rate of operation of the equipment exists since the time necessary for hardening is usually widely short in comparison with the time necessary for machining on a workpiece for each machine tool.

The object of the present invention is to provide a hardening equipment without providing a hardening unit every machine tool, having high operation rate, and a hardening control method, taking the above-mentioned circumstances into consideration.

SUMMARY OF THE INVENTION

The invention of claim 1 is hardening equipment having a plurality of machine tools located therein, for performing hardening operation on a workpiece in a plurality of said machine tools by laser beam, comprising:

said hardening equipment having a guide means for communicating between said machine tools;

an ejecting portion holding means having a laser beam ejecting portion being free to eject laser beam from its top end provided being free to move along said guide means among a plurality of said machine tools;

laser beam supply means for supplying laser beam, provided being connected with said laser beam ejecting portion;

ejecting portion holding means operation control means for performing hardening operation with laser beam ejected from said laser beam ejecting portion, controlling operations of said ejecting portion holding means; and communication control means for exchanging information necessary for hardening operation on said workpiece to be machined with said each machine tool with a control means of said each machine tool (such as a numerically controlled machine (not shown) installed on each machine tool), provided at said ejecting portion holding means operation control means.

According to the invention of claim 1, it is not necessary to provide a hardening unit for exclusive use for each machine tool and a hardening equipment having high rate of operation can be provided since the ejection portion holding means is moved among the machine tools along the guide means so as to harden a workpiece in each machine tool.

Besides, each machine tool can be controlled from the ejecting portion holding means operation control means side by the communication control means, and at the same time, various data concerning hardening on a workpiece can be supplied, it is not necessary to separately input the data (such as DATA) of the same workpiece into the machine tool or the ejection portion holding means operation control means, and efficient hardening operation is possible.

The invention of 2 is the hardening equipment as set forth in claim 1, wherein a workpiece data input means for inputting data concerning a shape of a workpiece is provided, a machining program composing means (such as a numerically controlled machine of each machine tool) for composing a machining program of said workpiece to be machined in said each machine tool from said data concerning shape of said workpiece input from said workpiece data input means is provided, a hardening program composing means for composing a hardening program from said data concerning shape of said workpiece input from said workpiece data input means is provided, and said ejecting portion holding means operation control means performs hardening operation on said workpiece machined with each machine tool on the basis of said machining program composed by said machining program composing means on the basis of said hardening program composed by said hardening program composing means.

According to the invention of claim 2, the machining program to be composed by the machining program composing means and the hardening program to be composed by the hardening program composing means can be composed from the data concerning the shape of the same workpiece input from the workpiece data input means, and the input operation of the data concerning the shape of the workpiece can be simplified.

The invention of claim 3 is the hardening equipment as set forth in claim 1, wherein said ejecting portion holding means operation control means has a machine tool control means for outputting an operation command (a cover opening command, a C-axis command, for instance) to said control means of said machine tool to said machine tool when hardening operation is performed on said workpiece machined with said machine tool.

According to the invention of claim 3, it is not necessary to compose a special program for hardening operation on the machine tool side, and the hardening operation can be all controlled from the hardening machine side so as to make the control of the hardening equipment simple since the operation commands (a cover opening command, a C-axis command or the like, for instance) to the control means of the machine tool can be output from the hardening machine side.

The invention of claim 4 is the hardening equipment as set forth in claim 1, wherein hardening operation by said ejecting portion holding means operation control means is performed on the basis of a hardening command from said control means of said machine tool.

According to the invention of claim 4, a hardening command can be output when the machining before hardening operation finishes on the machine tool side and preparations for hardening on a workpiece are made, the ejection portion holding means operation control means (a cover opening command, a C-axis command or the like, for instance) is prevented from inadvertently being driven during machining in the machine tool, and the control having high credibility is possible.

The invention of claim 5 is the hardening equipment as set forth in claim 3, wherein said operation command to said control means of said machine tool has an axis movement command (a C-axis command, for instance) to said machine tool.

According to the invention of claim 5, the control of the control axis of each machine tool is possible from the hardening machine side, it is necessary to compose no specific control axis command on the machine tool side at the time of hardening, and hardening operation can be smoothly performed.

The invention of 6 is the hardening equipment as set forth in claim 1, wherein a workpiece data input means for inputting data concerning a shape of a workpiece is provided, a machining program composing means (a numerically controlled machine of each machine tool or the like) for composing a machining program of said workpiece to be machined in said each machine tool from said data concerning shape of said workpiece input from said workpiece data input means is provided, a hardening program composing means for composing a hardening program from said data concerning said machining program composed by said machining program composing means is provided, and said ejecting portion holding means operation control means performs hardening operation on said workpiece machined with each machine tool on the basis of said machining program composed by said machining program composing means on the basis of said hardening program composed by said hardening program composing means.

According to the invention of claim 6, the hardening program can be composed on the basis of the machining program, the hardening program can be composed, diverting the machining program to be used for each machine tool, it is not necessary to input the data concerning the shape of a workpiece on both the machine tool side and the hardening machine side, and efficient operation is possible.

The invention of claim 7 is method of hardening in a hardening equipment having a plurality of machine tools located therein, for performing hardening operation on a workpiece in a plurality of said machine tools by laser beam, said method comprising:

providing a laser beam ejecting portion being free to eject laser beam from its top end, being free to move among a plurality of said machine tools;

selectively positioning said laser beam ejecting portion with respect to said machine tool when hardening is performed on said workpiece to be machined in a plurality of said machine tools; and performing a predetermined hardening operation on said workpiece in said machine tool in the above-mentioned state.

According to the invention of claim 7, hardening is possible, having the laser beam ejection portion for common use in the respective machine tools. Then, it is not necessary to provide the hardening unit for exclusive use for each machine tool, and the method of hardening having high operation rate can be provided.

The invention of claim 8 is the method of hardening as set forth in claim 7, wherein an axis movement command for driving a control axis of said machine tool is output to said machine tool, a workpiece is moved in said machine tool by said axis movement command so as to execute hardening operation when a predetermined hardening operation is performed on said workpiece in said machine tool to which said laser beam ejecting portion is positioned.

According to the invention of claim 8, the axis movement command (the C-axis command, for instance) is output to the machine tool and the machine tool is controlled by remote operation from the hardening machine side so as to execute hardening operation. And, it is necessary to compose no specific control axis command on the machine tool side at the time of hardening, and the hardening operation can be smoothly executed.

The invention of claim 9 is the method of hardening as set forth in claim 7, wherein a workpiece in said machine tool is held without detaching from said machine tool so as to harden said workpiece in the state of being held when a predetermined hardening operation is performed on said workpiece in said machine tool.

According to the invention of claim 9, a workpiece in the machine tool is held without detaching from the machine tool at the time of hardening so as to execute the hardening operation on the workpiece in the above-mentioned state, thereby hardening operation is possible, making use of the machining coordinate system to be used at the time of machining on the workpiece or the machining shape of the workpiece recognized by the machine tool side as it is, and the hardening operation can be easily executed.

The invention of claim 10 is the method of hardening as set forth in claim 7, wherein a machining program to be used in machining on a workpiece with said machine tool and a hardening program for hardening said workpiece in said machine tool with said laser beam ejection portion are composed from the same data concerning a shape of the workpiece.

According to the invention of claim 10, the machining program and the hardening program are composed from the data concerning the shape of the same workpiece, thereby the double input of the data can be avoided at the time of composing both programs, and efficient operation is possible.

The invention of claim 11 is the method of hardening as set forth in claim 7, wherein a hardening program for hardening a workpiece in said machine tool with said laser beam ejection portion is composed on the basis of a machining program to be used in machining on said workpiece with said machine tool.

According to the invention of claim 11, the hardening program is composed on the basis of the machining program, thereby the double input of the data can be avoided at the time of composing both programs, and efficient operation is possible.

The invention of claim 12 is the method of hardening as set forth in claim 7, wherein a hardening operation with said laser beam ejection portion is performed on the basis of hardening command output from said machine tool.

According to the invention of claim 12, the hardening operation is executed on the basis of the hardening command from the machine tool, thereby a hardening command can be output when the machining before hardening operation finishes on the machine tool side and preparations for hardening on a workpiece are made, the laser beam ejection portion is prevented from inadvertently being driven during machining on a workpiece in the machine tool, and the control having high credibility is possible.

BRIEF DESCRIPTION OF THE DRAWINGS

FIG. 2 is a view for showing control condition between a hardening machine and each machine tool at the time of hardening.

DESCRIPTION OF THE PREFERRED EMBODIMENTS

Figure 1:
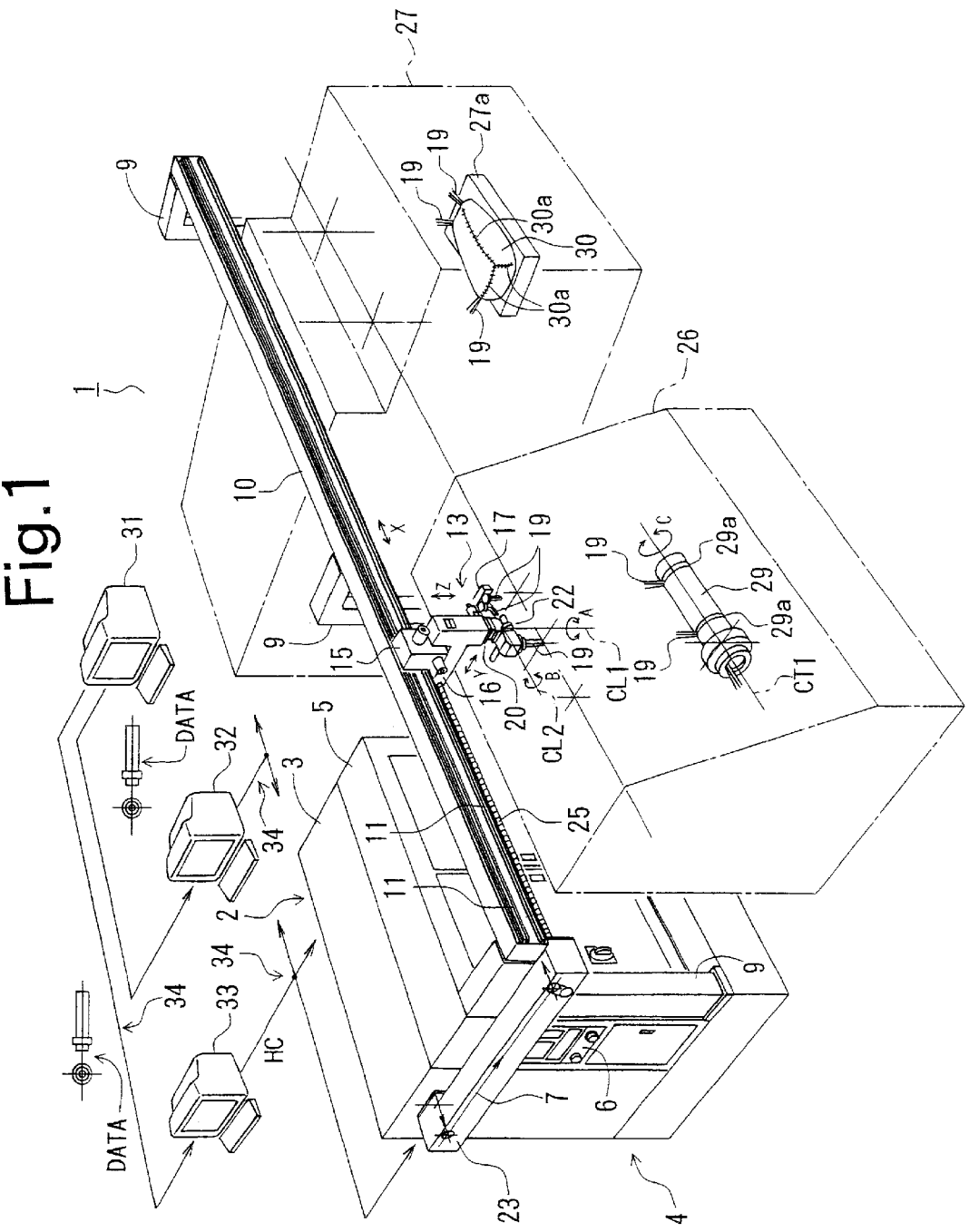
FIG. 1 is a view for showing an example of a hardening equipment to which the present invention is applied.

Embodiments of the present invention will now be explained hereinafter, referring to drawings.

FIG. 1 is a view for showing an example of a hardening equipment to which the present invention is applied, and FIG. 2 is a view for showing control condition between a hardening machine and each machine tool at the time of hardening.

As shown in FIG. 1, a hardening equipment 1 has a hardening machine body 2 comprising a hardening machine 4, and the hardening machine body 2 is formed so as to unite a laser beam oscillator 3 and a power supply cabinet 5 with each other. At a side of the power supply cabinet 5, a numerically controlled machine 6 is provided, and a guide rail 10 is level located on the front face of the hardening machine body 2 through a plurality of stanchions 9. On the side face of the guide rail 10, two rails 11, 11 are located being parallel along the guide rail 10 and in the level direction which is X-axis direction.

A hardening head 13 installing a nozzle 19 at its top is supported by the guide rail 10 through the rails 11, 11 being free to move, drive and position in the X-axis direction, and the hardening head 13 has a saddle 15. The saddle 15 is provided with a slider 16 being free to move and drive in the direction as shown by an arrow Y which is the level direction, orthogonal to the X-axis, and a nozzle storing unit 17 is provided on the side of the slider 16. A plurality of nozzles 19 are attachably and detachably supported by the nozzle storing unit 17, and the slider 16 is provided with an expansion cylinder 20 so as to expand, drive and position in a Z-axis direction, perpendicular to the X-axis and the Y-axis.

A rotatable head 22 attachably and detachably installing the nozzle 19 at its end is provided at a lower end of the expansion cylinder 20 in the figure being free to rotate, drive and position in a direction as shown by an arrow A with a center axis CL1 parallel to the Z-axis direction as its center, and being free to rotate, drive and position in a direction as shown by an arrow B with a center axis CL2 parallel to the X-axis as its center. The nozzle 19 is attachably and detachably installed on the top end of the rotatable head 22, and laser beam can be radiated from the top end of the nozzle 19 to the outside.

On the other hand, a laser beam duct 23 is provided between the laser beam oscillator 3 and the guide rail 10. And, a laser beam expansion duct 25 is provided between the laser beam duct 23 and the hardening head 13 being free to expand together with the movement of the hardening head 13 on the guide rail 10 in the X-axis direction.

Besides, a numerically controlled lathe 26 and a machining center 27 as machine tools are located on the lower hand along the guide rail 10 on which the hardening head 13 moves in the X-axis direction. Inside the numerically controlled lathe 26, a workpiece 29 is provided being free to rotate, drive and position in a direction as shown by an arrow C with an axial center CT1 as its center, being held by a chuck (not shown). And, inside the machining center 27, a workpiece 30 is provided, located on a table 27a. On the respective workpieces 29, 30, portions to be hardened 29a, 30a are set.

Furthermore, the hardening equipment 1 has a known CAD (computer-aided design) 31 capable of plotting a workpiece or the like on a computer, and known CAMs (computer-aided manufacturing) 32, 33 are connected with the CAD 31 through a known communication network 34, such as LAN. Furthermore, the hardening machine body 2, the numerically controlled lathe 26, the machining center 27 and the like are connected with the CAMs 32, 33 through the known communication network 34, such as LAN.

The hardening equipment 1 has such a structure. In order to machine the workpieces 29, 30 with the respective machine tools so as to harden with the hardening equipment 1, working drawing of the workpiece to be machined with each machine tool is plotted, using the CAD 31.

Drawing data DATA of the working drawing plotted by the CAD 31 are transferred to the CAMs 32, 33 through the communication network 34, and the CAM 32 outputs the transferred drawing data DATA to the numerically controlled lathe 26 or the machining center 27 which is a corresponding machine tool.

Each machine tool composes a machining program by a known method on the basis of the drawing data DATA (on this occasion, the machining program can be composed by the CAM 32) and makes preparations for machining.

On the other hand, the CAM 33 takes data necessary for hardening operation out of the drawing data DATA transferred, and composes the hardening program concerning each workpiece so as to output to the hardening machine 4. On this occasion, any method of composing the hardening program may be used in addition to the above-mentioned method as long as the position of the workpiece to be hardened can be designated by the hardening program. That is, the method of taking various data concerning the workpiece which is the basis at the time of composing the hardening program is optional, and various methods can be used. For instance, the hardening program may be composed by receiving the transfer of shape data SDT of the workpiece necessary for hardening of the machining program concerning the workpiece to be hardened from each machine tool side, and on the basis of the shape data SDT, as shown in FIG. 2.

This is because the hardening operation is performed on the workpiece machined in a predetermined shape with each machine tool, the machining shape data of the workpiece stored in the machining program to be executed by each machine tool can be shared, and the nozzle 19 can be easily positioned with respect to the workpiece 29 or 30 in the machine tool, on which the machining on the basis of the machining program is performed, making use of the machining shape data. Then, the hardening program can be easily composed without newly inputting the shape data concerning the machined workpiece in the CAM 33 or the numerically controlled machine 6 of the hardening machine 4 side by an operator.

That is, the basis of the shape data of the workpieces 29, 30 is the data concerning the shape of the workpiece input by the CAD 31, such as the drawing data DATA, and the data of the workpiece concerning shape are transferred to the CAM 32 of the machine tool side or the CAM 33 of the hardening machine 4 side, making use of the communication network 34 so as to use for composing the machining program and the hardening program. Then, the input of the data concerning the shape of the workpiece 29 finishes once the data are input in the CAM 32, and it is not necessary to separately input every machining on each hardening machine body 2 side or each machine tool side.

Furthermore, the hardening program may be composed on the numerically controlled machine 6 side concerning the workpiece having complex shape by operating the hardening head 13 directly with the hands of a worker so as to execute teaching.

After the machining program and the hardening program of the workpieces 29, 30 to be machined with the numerically controlled lathe 26 or the machining center 27 are composed and the programs are transferred to the respective machine tools in this way, on each machine tool side, mechanical machining on the workpieces 29, 30 is performed on the basis of the machining program in the numerically controlled lathe 26 or in the machining center 27 in steps S1 and S2, as shown in FIG. 2.

When the mechanical machining on the workpiece finishes in each machine tool in steps S1 and S2, machining finish notice MT is input in the CAM 33 of the hardening machine body 2 from each machine tool through the communication network 34. Receiving this, the CAM 33 outputs hardening program execution command HC for instructing the numerically controlled machine 6 of the hardening machine body 2 to execute the hardening program and outputs interlock command IRC for instructing the machine tool, to which machining finish command is output, to stop the machining program during execution at the present through the communication network.

In the machine tool to which the interlock command IRC is outputs in step S3 of FIG. 2, the machining program during execution at the present is stopped, and the finish of the preparation of output of the hardening command is acknowledged so as to interlock all the control axes. Thereafter, hardening command HC1 to the workpieces 29, 30 is output to the numerically controlled machine 6 of the hardening machine 4 side.

Receiving this, the numerically controlled machine 6 of the hardening machine body 2 executes hardening program HPR. The hardening program HPR includes various kinds of operation commands to the machine tool in which the workpiece to be hardened from now on is located at the time of execution of the hardening program HPR, that is, to the numerically controlled lathe 26 or to the machining center 27, as shown in FIG. 2.

Step S101 of the hardening program HPR, for instance, is a cover opening command OC for opening the cover of the numerically controlled lathe 26 or the machining center 27 in which the workpiece to be hardened from now on is located. When the cover opening command OC is input in the corresponding machine tool through the communication network 34, the cover of the machine is immediately opened on the machine tool side in step S4, and the upper portion of FIG. 1 of the machine is opened so as to release the inside of the machining area outside. When the cover is opened, opening finish report MC1 is output to the numerically controlled machine 6 through the communication network 34 from the machine tool side.

Subsequently, the numerically controlled machine 6 of the hardening machine body 2 moves and drives the hardening head 13 in the X-axis direction along the guide rail 10 so as to position at a predetermined position on the upper hand of the numerically controlled lathe 26 or the machining center 27 to which the hardening command HC1 is output. Then, the hardening head 13 is positioned on the upper hand of the workpiece 29 or 30 in the machine tool which cover is already opened.

Thereafter, the numerically controlled machine 6 instructs to detach the nozzle 19 installed on the rotatable head 22, and select and install the nozzle 19 corresponding to the hardening shape of the workpiece to be hardened from now on among a plurality of nozzles stored in the nozzle storing unit 17 so as to exchange the nozzle 19 in step S102 of the hardening program HPR. If the nozzle 19 installed on the rotatable head 22 in advance is the nozzle corresponding to the hardening shape of the workpiece to be hardened from now on, the above-mentioned step is neglected.

After the nozzle corresponding to the hardening shape of the workpiece to be hardened from now on is installed on the rotatable head 22 in this way, the slider 16 and the rotatable head 22 are moved in the direction as shown by the arrow Y and in the Z-axis direction, the nozzle 19 is lowered on the workpiece 29 or 30 side in the machine tool so as to enter in the machining area of each machine tool. Then, the top end of the nozzle 19 and the position of the workpiece to be hardened are faced each other. As mentioned before, the nozzle 19 is controlled being free to move and position in five axes directions, that is, in the X-axis direction, in the Y-axis direction, in the Z-axis direction orthogonal to each other, in the A-axis direction which is the rotating direction with the axis parallel to the Z-axis direction as its center and in the B-axis direction which is the rotating direction with the axis parallel to the X-axis as its center, then the top end of the nozzle 19 can be positioned at an optional position of three dimensional space.

In this state, the laser beam oscillator 3 is driven so as to supply the hardening head 13 with laser beam through the laser beam duct 23 and the laser beam expansion duct 25. Furthermore, the nozzle 19 is supplied with laser beam via the expansion cylinder 20. Then, laser beam is radiated on the portion to be hardened 29a or 30a of the workpiece 29 or 30 facing the nozzle 19 so as to harden. On this occasion, the workpieces 29, 30 in the respective machine tools are held without being detached from the machine tools. That is, the workpiece is held in such a state that machining on the basis of the machining program is performed on the workpiece with the machine tool, the workpiece 29 in the numerically controlled lathe 26 is held with chuck(s) (not shown) in its one end or its both ends, and the workpiece 30 in the machining center 27 is held in the state of being located on the table 27a. Therefore, the position and the shape of the workpiece 29, 30 in each machine tool are clear for each machine tool in addition to its spatial coordinate position. Then, the position and the shape of the workpiece to be hardened from now on are clear also for the numerically controlled machine 6 of the hardening machine 4 connected with each machine tool through the communication network 34, and the positioning of nozzle 19 with respect to the workpieces 29, 30 and succeeding hardening operation can be correctly performed.

If it is necessary to perform hardening moving the workpieces 29, 30 at the time of hardening for instance, an axis movement command is output from the numerically controlled machine 6 side of the hardening machine 4 to the corresponding machine tool through the communication network 34 in step S103 of the hardening program HPR so as to drive and control the machine tool, remotely controlling from the numerically controlled machine 6 side of the hardening machine 4. On this occasion, no program concerning the hardening operation to be performed by the hardening machine 4 is composed on each machine tool side. But, the operation command to the machine tool in which the workpiece to be hardened is held is composed on the basis of the shape data of the workpiece input from the CAD 31 or the like on the hardening machine 4 side, and smooth hardening is possible by driving and controlling each machine tool on the basis of the command.

In the concrete, step S103 is a C-axis rotation command MC2 for rotating the C-axis of the numerically controlled lathe 26 in which the workpiece to be hardened from now on is located so as to rotate the workpiece at a predetermined angular velocity. When the C-axis rotation command MC2 is output to the numerically controlled lathe 26 from the numerically controlled machine 6 of the hardening machine 4, the C-axis rotation controlling operation corresponding to step S5 is executed by executing the macros stored in the numerically controlled lathe 26 on the numerically controlled lathe 26 side. This operation is performed completely similar to the normal case where the machining program in the numerically controlled lathe 26 instructs the C-axis rotation controlling operation at the time of machining with the numerically controlled lathe 26. In this way, the chuck (not shown) is rotated and controlled in the direction as shown by the arrow C by remotely operating from the numerically controlled machine 6 of the hardening machine 4 through the communication network 34, and the position of the nozzle 19 is controlled with five axes, synchronizing this C-axis rotation controlling so as to harden a predetermined portion to be hardened 29a in step S104 of the hardening program HPR.

The above-mentioned is similar in the machining center 27 also. When the hardening is performed on the workpiece 30 in the machining center 27, the axis movement command to the machining center 27 is composed in the hardening program HPR. And, the hardening is performed on a predetermined portion to be hardened 30a in the machining center 27 in such a manner that the table 27a is driven and controlled in a horizontal direction by remote operation from the numerically controlled machine 6 of the hardening machine 4 through the communication network 34, and the position of the nozzle 19 is controlled with five axes in step S104 of the hardening program HPR, synchronizing the control of the table 27a in a horizontal direction.

In this way, the workpieces 29, 30 held in the machine tools are hardened with laser beam by driving and controlling each machine tool with remote operation from the numerically controlled machine 6 side of the hardening machine 4 and by driving and controlling the nozzle 19 by the machine tool itself.

When finish of the driving operation in step S5 (the C-axis rotation operation, for instance) is noticed by a C-axis rotation finish notice MC5 from each machine tool side and the hardening operation on the workpieces 29, 30 is finished, the numerically controlled machine 6 of the hardening machine 4 retreats the nozzle 19 from the machining area of each machine tool on the upper hand of FIG. 1.

Subsequently, the hardening program HPR enters in step S105, and a cover closing command MC3 is output to the machine tool wherein hardening operation finishes through the communication network 34, and the corresponding machine tool closes its cover in step S6. Then, the operation on the machine tool side finishes. When a cover closing finish notice MC4 is input through the communication network 34 from the machine tool on the hardening machine 4 side, the saddle 15 is moved and driven in the X-axis direction on the guide rail 10 in step S106 so as to return all the control axes of X, Y, Z, A and B to their original points. Then, the execution of the hardening program HPR finishes.

In the above-mentioned embodiment, the guide rail 10 is provided in a horizontal direction above each machine tool. But, the guide rail 10 may be located at any other places in addition to the upper hand of each machine tool as long as the hardening head 13 can be entered in and retreated from the machining area (the machining area is generally inside of a machine tool separating its inside from its outside by a cover being free to open and close, and it means the space wherein machining on a workpiece is performed and its neighboring space) of each machine tool.

Besides, the guide rail 10 may be provided in the shape of a curve line in addition to in the shape of a straight line. Furthermore, the guide rail 10 may be located on a floor so as to move ejecting portion holding means, such as the hardening head 13, on the guide rail 10 provided on a floor. And, guide means, such as the guide rail 10, may be comprised of a guidance cable buried in a floor so as to move the ejecting portion holding means, such as the hardening head 13, among machine tools, guided by the guidance cable.

Furthermore, the laser beam supply path between the laser beam oscillator 3 and the nozzle 19 for ejecting laser beam outside and hardening a workpiece may be a flexible member, such as optical fiber, in addition to the laser beam duct 23 and the expansion duct 25. And, the saddle 15 may be equipped with the laser beam oscillator 3 so as to move together with the saddle.

Besides, the structure of the ejecting portion holding means for holding the laser beam ejecting portion, such as the nozzle 19, is optional, and its axial structure is also optional as long as the nozzle 19 can be optionally positioned in a space. Furthermore, various typed machine tools may be located as a machine tool for performing hardening in addition to the numerically controlled lathe 26 and the machining center 27, and any structure of the machine tool may be located as long as a workpiece during machining and a workpiece on which machining finishes can be held in a machining area.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. Hardening equipment having a plurality of machine tools located therein, for performing hardening operation on a workpiece in a plurality of said machine tools by laser beam, comprising:

said hardening equipment having a guide means for communicating between said machine tools;

an ejecting portion holding means having a laser beam ejecting portion being free to eject laser beam from its top end provided being free to move along said guide means among a plurality of said machine tools;

laser beam supply means for supplying a laser beam, provided being connected with said laser beam ejecting portion;

an ejecting portion holding means operation control means for performing hardening operation with laser beam ejected from said laser beam ejecting portion, controlling operations of said ejecting portion holding means; and a communication control means for exchanging information necessary for hardening operation on said workpiece to be machined with said each machine tool with a control means of said each machine tool, provided at said ejecting portion holding means operation control means.

2. The hardening equipment as set forth in claim 1, wherein a workpiece data input means for inputting data concerning a shape of a workpiece is provided, a machining program composing means for composing a machining program of said workpiece to be machined in said each machine tool from said data concerning shape of said workpiece input from said workpiece data input means is provided, a hardening program composing means for composing a hardening program from said data concerning shape of said workpiece input from said workpiece data input means is provided, and said ejecting portion holding means operation control means performs hardening operation on said workpiece machined with each machine tool on the basis of said machining program composed by said machining program composing means on the basis of said hardening program composed by said hardening program composing means.

3. The hardening equipment as set forth in claim 1, wherein said ejecting portion holding means operation control means has a machine tool control means for outputting an operation command to said control means of said machine tool to said machine tool when hardening operation is performed on said workpiece machined with said machine tool.

4. The hardening equipment as set forth in claim 1, wherein hardening operation by said ejecting portion holding means operation control means is performed on the basis of a hardening command from said control means of said machine tool.

5. The hardening equipment as set forth in claim 3, wherein said operation command to said control means of said machine tool has an axis movement command to said machine tool.

6. The hardening equipment as set forth in claim 1, wherein a workpiece data input means for inputting data concerning a shape of a workpiece is provided, a machining program composing means for composing a machining program of said workpiece to be machined in said each machine tool from said data concerning shape of said workpiece input from said workpiece data input means is provided, a hardening program composing means for composing a hardening program from said data concerning said machining program composed by said machining program composing means is provided, and said ejecting portion holding means operation control means performs hardening operation on said workpiece machined with each machine tool on the basis of said machining program composed by said machining program composing means on the basis of said hardening program composed by said hardening program composing means.

7. Method of hardening in a hardening equipment having a plurality of machine tools located therein, for performing hardening operation on a workpiece in a plurality of said machine tools by laser beam, said method comprising:

providing a laser beam ejecting portion being free to eject laser beam from its top end, being free to move among a plurality of said machine tools;

selectively positioning said laser beam ejecting portion with respect to said machine tool when hardening is performed on said workpiece to be machined in a plurality of said machine tools; and performing a predetermined hardening operation on said workpiece in said machine tool in the above-mentioned state.

8. The method of hardening as set forth in claim 7, wherein an axis movement command for driving a control axis of said machine tool is output to said machine tool, a workpiece is moved in said machine tool by said axis movement command so as to execute hardening operation when a predetermined hardening operation is performed on said workpiece in said machine tool to which said laser beam ejecting portion is positioned.

9. The method of hardening as set forth in claim 7, wherein a workpiece in said machine tool is held without detaching from said machine tool so as to harden said workpiece in the state of being held when a predetermined hardening operation is performed on said workpiece in said machine tool.

10. The method of hardening as set forth in claim 7, wherein a machining program to be used in machining on a workpiece with said machine tool and a hardening program for hardening said workpiece in said machine tool with said laser beam ejection portion are composed from the same data concerning a shape of the workpiece.

11. The method of hardening as set forth in claim 7, wherein a hardening program for hardening a workpiece in said machine tool with said laser beam ejection portion is composed on the basis of a machining program to be used in machining on said workpiece with said machine tool.

12. The method of hardening as set forth in claim 7, wherein a hardening operation with said laser beam ejection portion is performed on the basis of hardening command output from said machine tool.

* * * * *